Patented Oct. 30, 1934

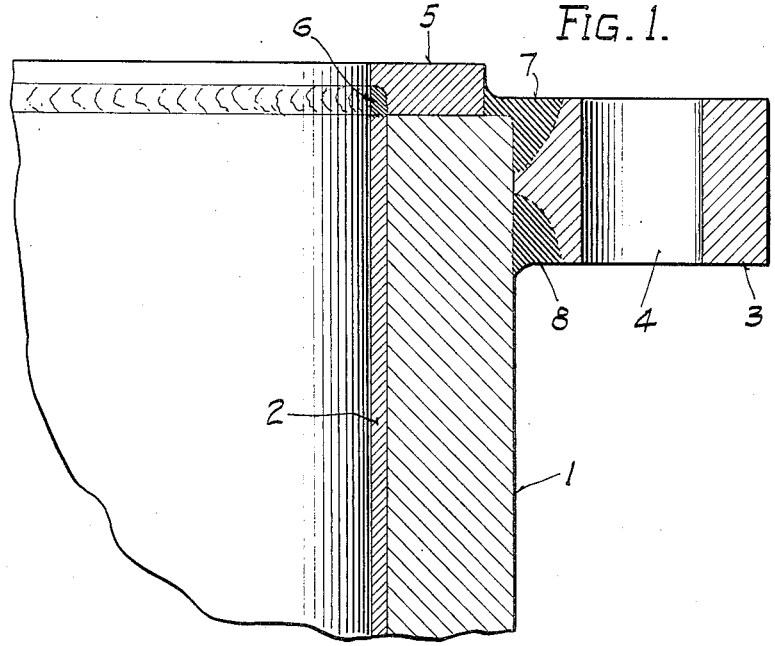
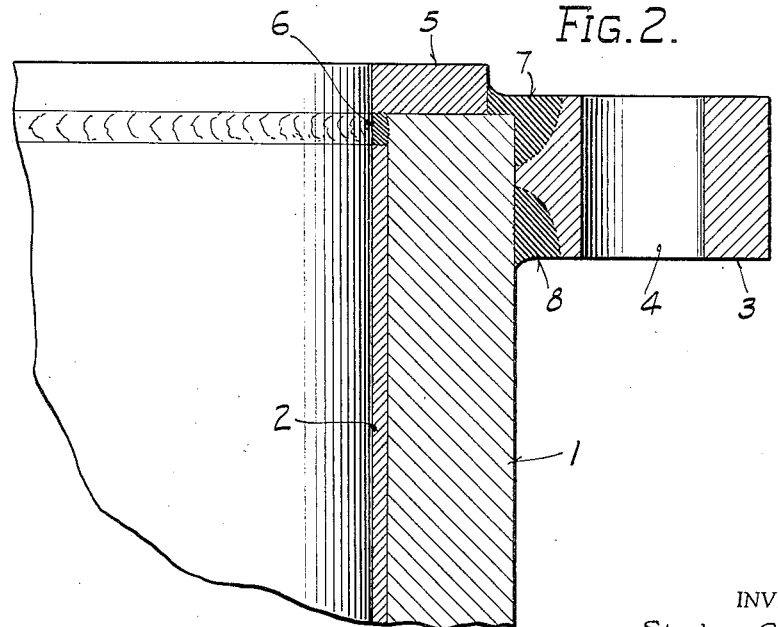

1,978,610

UNITED STATES PATENT OFFICE 1,978,610

LINED PRESSURE VESSEL NOZZLE

Stephen Straty, Milwaukee, Wis., assignor to A. O. Smith Corporation, Milwaukee, Wis., a corporation of New York Application June 24, 1933, Serial No. 677,373

6 Claims. (Cl. 220—63)

This invention relates to a lined pressure vessel nozzle or manway and more particularly to the construction of an alloy seat at the outer end of the nozzle for facilitating sealing with a closure or conduit.

The object of the invention is to provide a durable alloy seat of inexpensive and simple construction.

Another object is to provide a continuous corrosion resisting lining for the nozzle and to connect it to the alloy seat in a manner eliminating all exposure of the corrosive steel of the nozzle.

The accompanying drawing illustrates the preferred embodiment of the invention.

Figure 1 shows a longitudinal section through a portion of a nozzle or manway at one side.

Fig. 2 is a similar view showing a modification of the structure.

The manway neck 1 is tubular and is constructed of carbon steel or other suitable metal for the purpose.

A lining 2 of corrosion resistant metal or alloy such as copper, stainless steel, chromium-iron alloy or nickel-iron alloy, depending upon the use to which the vessel is being subjected, is welded or otherwise secured to the inside wall of the neck 1.

In order to secure a closure or pipe connection to the end of the manway it is preferable to provide a flange 3 having bolt holes 4 therethrough. The flange 3 is welded to the outside wall of the neck 1 as shown, or in any suitable manner. The top of flange 3 may be flush with the end of the manway neck 1, but it is preferable to have the flange a little higher, as illustrated, for reasons hereinafter pointed out.

An alloy seat 5 is formed of a plate or strip of metal preferably of the same composition as the liner 2, and is ring shaped, having an inside diameter the same as that of the liner 2 and an outside diameter less than that of the manway neck 1, as shown. The inner corner of the seat 5 is chamfered to provide a groove shown as filled with weld metal 6. This groove extends circumferentially at the inside of the manway and is bounded by the alloy seat 5 on one side and at its bottom, and by the end edge of the liner 2 on the other side.

The groove may be formed without chamfering the seat 5 by shortening the liner 2 so that the groove is bounded by the lower surface of seat 5 and the end edge of liner 2 as its sides, and by the inner wall of the neck 1 as its bottom, as clearly illustrated in Fig. 2.

In securing the seat 5 to the neck an alloy weld 6 is deposited in the groove to weld the seat and liner together. The weld 6 is preferably of corrosion resistant metal of similar composition to that of the seat 5 and liner 2 so that the entire inner surface of the neck 1 is protected from corrosion.

The seat 5 is preferably welded to the manway neck 1 by weld metal 7 deposited in a groove formed at the outer circumference of the seat 5. This groove extends circumferentially of the manway and is bounded by the outside edge of the seat 5, the inside edge of the flange 3 and the end edge of the neck 1. Weld metal 7 may be of ordinary steel composition as may also the weld 8 joining the flange 3 to the neck 1 as previously described.

The welding is preferably carried out by the electric arc welding method employing heavily covered metal electrodes suitable for fabricating pressure vessels.

The alloy seat 5 may have its upper surface machined to any suitable contour for facilitating sealing with a connecting member or cover.

The invention provides a minimum of alloy welding and thereby eliminates considerable expense in the construction of the manway.

I claim:

1. A welded tubular connection comprising a tubular member, a lining therefor of corrosion resistant metal, a ring plate of corrosion resistant material similar to said lining at one end of said member having an internal diameter the same as that of said lining and having its lower corner chamfered next to the end of said lining to provide a welding groove between said plate and liner, and corrosion resistant weld metal deposited in said groove and uniting said alloy plate with said liner.

2. A welded tubular connection comprising a tubular member, a flange welded to the outer circumference of said member at one end, with the top surface of the flange raised above the end of said member, a ring plate adapted to form a seat for sealing a connection at the end of said member and having a smaller outer diameter than said member whereby a welding groove is provided at the end of said member between the inner edge of said flange and the outer circumference of the plate, and weld metal filling said groove and welding the tubular member, flange and plate into an integral structure.

3. A welded tubular connection comprising a tubular member of steel, a steel flange welded to the outer circumference of said member at one end, with the top surface of the flange raised above the end of said member, a corrosion resisting alloy lining for said member, an alloy ring plate having an inner diameter equal to that of said liner and an outer diameter less than that of said member, said plate being chamfered at its inner edge to provide a welding groove between it and the end of said liner, alloy weld metal deposited in said groove and welding said plate and liner together, and weld metal deposited between the outer edge of said plate and inner edge of said flange at the end of said tubular member welding said parts into an integral structure.

4. A welded tubular connection comprising a tubular member, a lining therefor of corrosion resistant metal, a ring plate of corrosion resistant material similar to said lining at one end of said member having an internal diameter the same as that of said lining, said parts being assembled providing a welding groove between said alloy plate and liner, and corrosion resisting metal deposited in said welding groove and welding said plate and liner together, said plate being welded to the tubular member at its outer circumference.

5. A welded tubular connection comprising a tubular member, a lining therefor of corrosion resistant metal, a ring plate of corrosion resistant material similar to said lining at one end of said member having an internal diameter the same as that of said lining, said parts being assembled providing a welding groove between said alloy plate and liner, and corrosion resisting metal deposited in said welding groove and welding said plate and liner together.

6. A welded tubular connection comprising a tubular member, a lining therefor of corrosion resisting metal, said lining being shorter than said member at one end, a ring plate of corrosion resisting metal similar to said lining at the end of said member extending from the liner, said ring plate having an inside diameter the same as that of said lining and providing with the end of the lining and the inside surface of said member a welding groove, and corrosion resisting weld metal deposited in said welding groove and welding said parts together.

STEPHEN STRATY.